(12) United States Patent
Merrill et al.

(10) Patent No.: US 10,614,347 B2
(45) Date of Patent: Apr. 7, 2020

(54) IDENTIFYING PARAMETER IMAGE ADJUSTMENTS USING IMAGE VARIATION AND SEQUENTIAL PROCESSING

(71) Applicant: ADOBE INC., San Jose, CA (US)

(72) Inventors: Peter Merrill, Sunnyvale, CA (US); Gregg Darryl Wilensky, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 15/879,682

(22) Filed: Jan. 25, 2018

(65) Prior Publication Data

US 2019/0228273 A1  Jul. 25, 2019

(51) Int. Cl.
| | |
|---|---|
| *G06K 9/66* | (2006.01) |
| *G06N 3/08* | (2006.01) |
| *G06T 11/60* | (2006.01) |
| *G06K 9/62* | (2006.01) |
| *G06N 3/04* | (2006.01) |

(52) U.S. Cl.
CPC ............. *G06K 9/66* (2013.01); *G06K 9/6202* (2013.01); *G06N 3/0454* (2013.01); *G06N 3/08* (2013.01); *G06N 3/084* (2013.01); *G06T 11/60* (2013.01); *G06N 3/0445* (2013.01)

(58) Field of Classification Search
None
See application file for complete search history.

(56) References Cited

U.S. PATENT DOCUMENTS

| 2017/0286809 A1* | 10/2017 | Pankanti | ................... G06K 9/66 |
| 2018/0253866 A1* | 9/2018 | Jain | ......................... G06K 9/628 |
| 2019/0130545 A1* | 5/2019 | Cardei | ............... H04N 5/23222 |
| 2019/0279345 A1* | 9/2019 | Kim | ...................... G06K 9/6256 |

OTHER PUBLICATIONS

Fang, H., & Zhang, M. (2017). Creatism: A deep-learning photographer capable of creating professional work. arXiv preprint arXiv:1707.03491.

Yan, Z., Zhang, H., Wang, B., Paris, S., & Yu, Y. (2014). Automatic Photo Adjustment Using Deep Neural Networks. arXiv preprint arXiv:1412.7725.

\* cited by examiner

*Primary Examiner* — David Perlman
(74) *Attorney, Agent, or Firm* — Shook, Hardy & Bacon, L.L.P.

(57) ABSTRACT

Methods and systems are provided for identifying parameter image adjustments. In embodiments, a set of candidate parameter values associated with a parameter to be analyzed in association with an image is identified. Subsequently, the image is rendered in accordance with each candidate parameter value to generate a set of rendered images. A neural network can then be used to identify a parameter image adjustment to apply to the image based on features associated with the set of rendered images. The neural network can be trained based on a comparison of the identified parameter image adjustment and a reference parameter value associated with the parameter being analyzed.

20 Claims, 5 Drawing Sheets

IDENTIFYING PARAMETER IMAGE ADJUSTMENTS USING IMAGE VARIATION AND SEQUENTIAL PROCESSING

BACKGROUND

Oftentimes, users desire to adjust various aspects of an image to create a desired image. For example, a user may desire to modify contrast or exposure in an image. Typically, when multiple aspects are modified, such a manual process is time consuming as one aspect is modified and evaluated before a next aspect is modified and evaluated. This process can continue until a desired image is achieved.

Some conventional systems have been developed to automate image adjustments or corrections. Currently, automated image adjustments largely rely on large neural networks that require an extensive amount of training. Accordingly, such conventional systems necessitate an extensive amount of training images, a large amount of memory, and a slow processing time.

SUMMARY

Embodiments of the present invention are directed to facilitating efficient identification of parameter image adjustments for use in adjusting images. As described herein, parameter image adjustments can be identified using image variation and sequential processing thereby resulting in a more efficient neural network system. In particular, multiple neural networks can be trained and utilized to identify parameter values for adjusting or correcting images. Consecutive neural networks can each be input with multiple image rendering data to learn parameter image adjustments. In this regard, a particular neural network can be used to identify a parameter image adjustment associated with a particular parameter.

To identify a parameter image adjustment associated with a particular parameter, an image is rendered in accordance with multiple candidate parameter values. Each of the rendered image variations can be analyzed to produce an analysis vector that represents features associated with the rendered image. The analysis vectors associated with the image variations can be aggregated to generate a composite analysis vector for inputting into the corresponding neural network. As such, the neural network can better learn to predict a parameter image adjustment as the neural network is directly provided with results of various renderings associated with multiple candidate parameter values.

DETAILED DESCRIPTION

Figure 1:
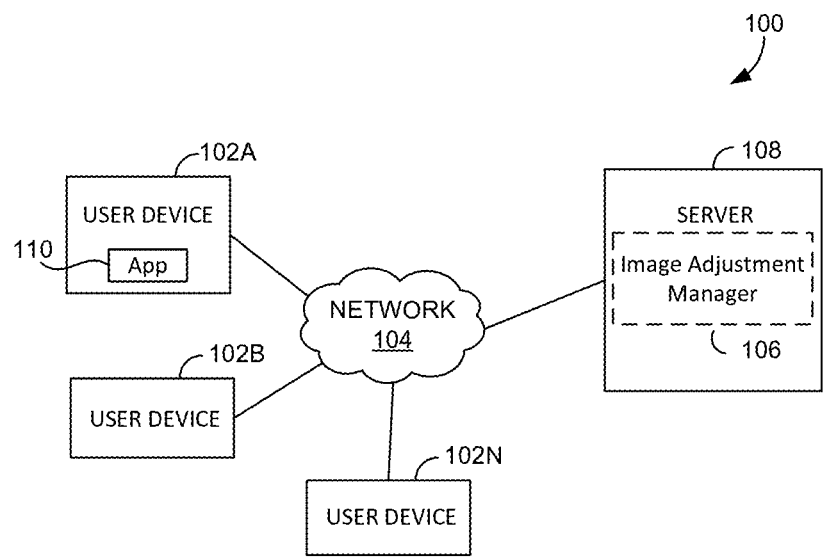
FIG. 1 depicts a diagram of an environment in which one or more embodiments of the present disclosure can be practiced, in accordance with various embodiments of the present disclosure.

Adjusting or correcting a digital image, for example, to adjust contrast, exposure, etc., can be time intensive. For instance, a photographer may initially adjust one aspect of the image (e.g., contrast). The adjusted image can then be viewed and analyzed by the photographer to identify another aspect of the image to adjust (e.g., exposure). This manual image adjusting process can continue until a desired image is achieved. As numerous aspects can be adjusted in an image, such a process can be tedious and inefficient.

Some conventional systems have been developed to automate image adjustments or corrections. In particular, some conventional systems use deep learning, that is, multi-layered neural networks to automate image adjustments. To suitably capture the sophistication of the correspondences between images and parameters, large neural network sizes are typically required. Such large neural network sizes, however, necessitate an extensive amount of training images, a large amount of memory, and a slow processing time.

As such, embodiments of the present disclosure are directed to facilitating efficient identification of parameter image adjustments. A parameter image adjustment refers to an amount or value for adjusting or correcting, or to which to adjust or correct, an image in association with a parameter (e.g., contrast, exposure, etc.). As described herein, parameter image adjustments can be identified using image variation and sequential processing thereby resulting in a more efficient neural network system. In particular, multiple neural networks can be trained and utilized to identify parameter values for adjusting or correcting images. At a high-level, consecutive neural networks are each input with multiple image rendering data to learn parameter image adjustments. In this regard, a particular neural network can be used to identify a parameter image adjustment associated with a particular parameter. By way of example only, a first neural network can be used to identify a first parameter image adjustment associated with a first parameter (e.g., exposure) and, subsequently, a second neural network can be used to identify a second parameter image adjustment associated with a second parameter (e.g., contrast).

To identify a parameter image adjustment associated with a particular parameter, an image is rendered in accordance with multiple candidate parameter values. Each of the rendered image variations is analyzed to produce an analysis vector that represents features associated with the rendered image. The analysis vectors associated with the image variations can be aggregated to generate a composite analysis vector for inputting into the corresponding neural network. As such, the composite analysis vector includes features associated with multiple possible image processing parameter values. In this way, the neural network can better learn to predict a parameter image adjustment as the neural network is directly provided with results of various renderings associated with multiple candidate parameter values as opposed to needing to understand the complex image adjustments used by an image processing engine, which would require large amounts of training data.

Utilizing consecutive small neural networks, each trained with multiple parameter renderings of an image (e.g., a previously adjusted image), can improve efficiency. In particular, such an implementation reduces the training machinery, which can result in a reduced number of training examples, a smaller function size, and a faster function implementation. Accordingly, the neural network for this prediction can be much simpler, smaller, and more efficient than would otherwise be the case. Such a process can also result in a more effective prediction or identification of parameter image adjustments. For example, rather than predicting all image adjustments at one time, the parameter image adjustments are predicted sequentially to enable a previous adjustment to be taken into account in determining a subsequent adjustment. Further, rendering images in accordance with candidate parameter values and analyzing such rendered image variations can increase the ability to understand the complexity of the rendering engine without an extensive amount of training images.

Turning to FIG. 1, FIG. 1 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 5.

It should be understood that operating environment 100 shown in FIG. 1 is an example of one suitable operating environment. Among other components not shown, operating environment 100 includes a number of user devices, such as user devices 102a and 102b through 102n, network 104, and server(s) 108. Each of the components shown in FIG. 1 may be implemented via any type of computing device, such as one or more of computing device 500 described in connection to FIG. 5, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 5. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out identifying or predicting parameter image adjustments. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate identifying parameter image adjustments via image variation. In particular, a user can select or input an image or picture for which parameter image adjustment is desired. For instance, a user may select a desired image from a repository, for example, stored in a data store accessible by a network or stored locally at the user device 102a. As another example, a user may take a picture using a camera on a device, for example, user device 102a, for which a parameter image adjustment or automated image correction is desired. Although described as a user selecting an image, an image may be automatically selected.

Based on the input image, a set of one or more parameter image adjustments to apply to the image can be identified. In some cases, such parameter image adjustments can be provided as recommendations or suggestions. Accordingly, the recommended parameter image adjustments can be identified and provided to the user via the user device 102a. In this regard, the parameter image adjustment(s) can be displayed via a display screen of the user device. Parameter image adjustment recommendations can be presented in any manner. In addition or in the alternative to providing parameter image adjustment recommendations, the identified parameter image adjustments can be applied to render an automatically adjusted imaged. That is, a parameter image adjustment(s) can be applied (e.g., based on a user selection or automatically) to an input image to automatically adjust or correct the image.

As described herein, server 108 can facilitate identifying parameter image adjustments via image adjustment manager 106. Server 108 includes one or more processors, and one or more computer-readable media. The computer-readable media includes computer-readable instructions executable by the one or more processors. The instructions may optionally implement one or more components of image adjustment manager 106, described in additional detail below.

Image adjustment manager 106 can train and operate a neural network system in order to identify parameter image adjustments. Such a neural network system can be comprised of one or more neural networks trained to identify parameter image adjustments. For example, a neural network system can include neural networks that identify parameter image adjustments for input images. In this regard, each neural network can correspond with identifying or predicting a parameter value for a particular parameter.

At a high level, image adjustment manager 106 trains and utilizes a neural network system to identify parameter image adjustments. To train a neural network, the neural network can identify a parameter image adjustment based on input images. An input image generally refers to an image provided to the neural network system, or portion thereof. As described herein, an input image is rendered in association with a set of parameter values. Each rendered image is analyzed to identify features associated with the corresponding image. An analysis vector associated with each of the rendered images can be aggregated or concatenated to generate a composite analysis vector. The composite analysis vector can then be input into an image adjusting neural network to identify a parameter image adjustment(s) to apply to adjust or correct the input image.

A parameter image adjustment identified in accordance with training a neural network can be compared to a reference parameter value to facilitate training of the neural network. In this regard, the neural network can be modified or adjusted based on the comparison such that the quality of subsequently identified parameter image adjustments increases. As used herein, a reference parameter value refers to a value of a parameter that is used as a standard, or ground-truth, for evaluating the quality of a parameter image adjustment identified in association with a training input image by the neural network.

In various implementations, a neural network system of image adjustment manager 106 is iteratively trained using multiple training input images to identify image adjustment parameters. In each iteration, image adjustment manager 106 can select an input image and associated reference information. Reference information can include a reference parameter value, for example, indicated as a desired parameter value for the corresponding input image. As described, a reference parameter value may be input or selected by a professional photographer as an ideal value for the image. Image adjustment manager 106 generates multiple renderings of the input image in association with various parameter values and analyzes such rendered images to generate an analysis vector. The analysis vector can be input into a neural network to identify a parameter image adjustment associated with a particular parameter to apply to the input image. The parameter image adjustment can then be compared to the reference parameter value to compute any errors. Such errors can then be fed back through the neural network to teach the network to reduce such errors in future iterations.

As can be appreciated, any number of parameters may be adjusted for an image to result in a corrected, ideal or desired image. Accordingly, a set of neural networks can be sequentially trained to identify parameter image adjustments for multiple parameters. In this regard, and as described in more detail below, upon identifying a parameter image adjustment for a first parameter, a parameter image adjustment can be identified for a second parameter, and so on. Any number of neural networks can be used. For example, in some embodiments, a single neural network may be utilized. In other embodiments, a set of neural networks may be trained and utilized, each neural network trained to identify a parameter image adjustment in association with a particular parameter.

For cloud-based implementations, the instructions on server 108 may implement one or more components of image adjustment manager 106, and application 110 may be utilized by a user to interface with the functionality implemented on server(s) 108. In some cases, application 110 comprises a web browser. In other cases, server 108 may not be required. For example, the components of image adjustment manager 106 may be implemented completely on a user device, such as user device 102a. In this case, image adjustment manager 106 may be embodied at least partially by the instructions corresponding to application 110.

Thus, it should be appreciated that image adjustment manager 106 may be provided via multiple devices arranged in a distributed environment that collectively provide the functionality described herein. Additionally, other components not shown may also be included within the distributed environment. In addition, or instead, image adjustment manager 106 can be integrated, at least partially, into a user device, such as user device 102a. Furthermore, image adjustment manager 106 may at least partially be embodied as a cloud computing service.

Figure 2:
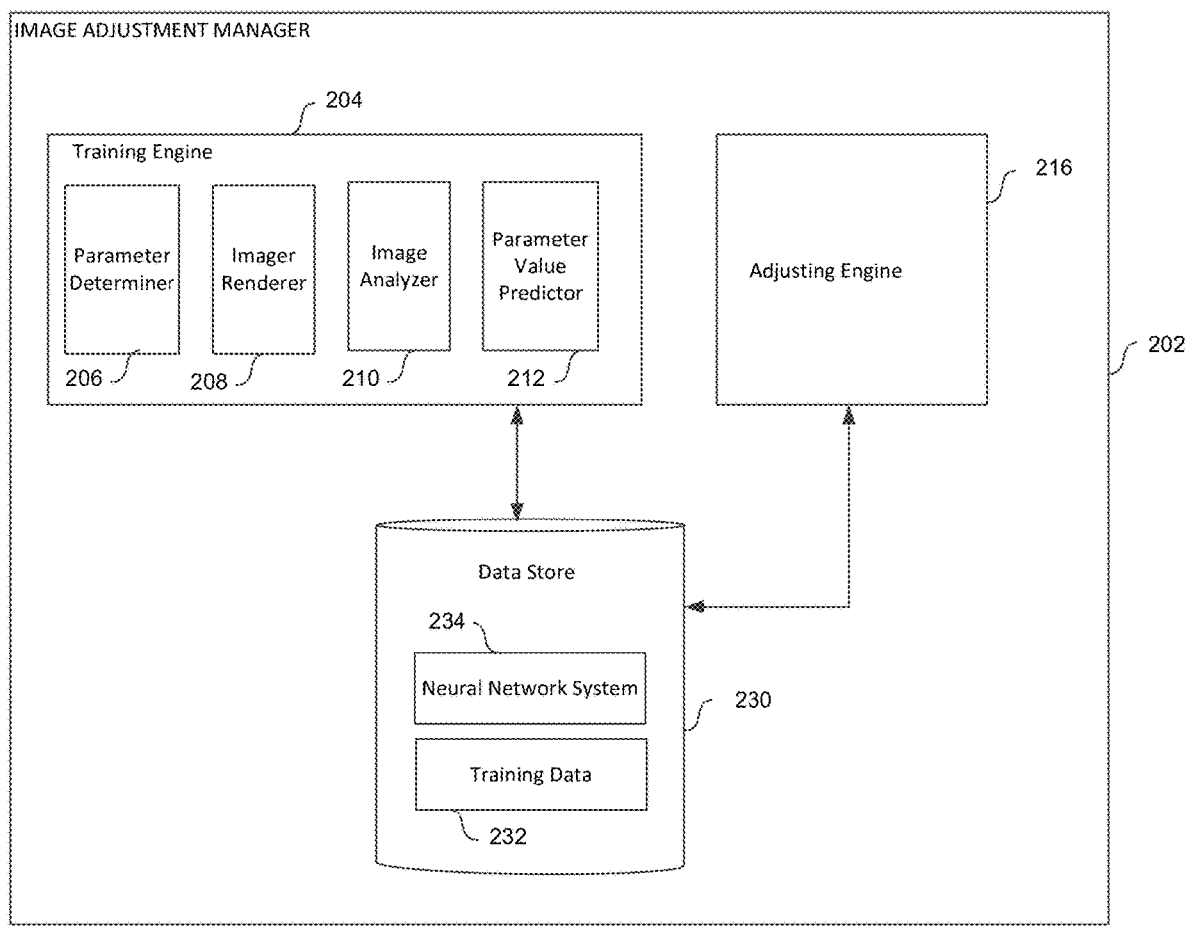
FIG. 2 depicts an example configuration of an operating environment in which some implementations of the present disclosure can be employed, in accordance with various embodiments of the present disclosure.

Referring to FIG. 2, aspects of an illustrative image adjusting system are shown, in accordance with various embodiments of the present disclosure. Image adjustment manager 202 includes training engine 204, adjusting engine 216, and data store 230. The foregoing components of image adjustment manager 202 can be implemented, for example, in operating environment 100 of FIG. 1. In particular, those components may be integrated into any suitable combination of user devices 102a and 102b through 102n, and server(s) 108.

Data store 230 can store computer instructions (e.g., software program instructions, routines, or services), data, and/or models used in embodiments described herein. In some implementations, data store 230 stores information or data received via the various components of image adjustment manager 202 and provides the various components with access to that information or data, as needed. Although depicted as a single component, data store 230 may be embodied as one or more data stores. Further, the information in data store 230 may be distributed in any suitable manner across one or more data stores for storage (which may be hosted externally).

In embodiments, data stored in data store 230 includes training data 232. Training data generally refers to data used to train a neural network, or portion thereof. As such, training data 232 can include reference parameter values, training images, and/or training parameter image adjustments. In some cases, image adjustment manager 202 can receive data from user devices (e.g., an input image received by user device 102a or another device associated with a user, via, for example, application 110). In other cases, data can be received from one or more data stores in the cloud.

Data store 230 can also be used to store neural network system 234. Such a neural network system can be comprised of one or more neural networks, for example, associated with various parameters. In embodiments, each neural network is trained to predict the value of the parameter for which it is associated. A neural network may be in any number of forms, such as for example, a fully connected network, a convolutional network, a residual network, a recurrent network, or the like. For instance, one implementation may use a fully connected feedforward neural network with one or two hidden layers of neurons.

Training engine 204 can be used to train neural network system 234. Such a neural network system can be used to identify parameter image adjustments. As depicted in FIG. 2, training engine 204 includes a parameter determiner 206, an image renderer 208, an image analyzer 210, and a parameter value predictor 212. Although the components shown in the training engine 204 are illustrated separately, as can be appreciated, the functionality described in association therewith can be performed by any number of components.

The training engine 204 can obtain an image(s) as input to utilize to train one or more neural networks. An input image for training a neural network can be any type of image. As one example, an input image may be an Adobe® Camera Raw file, which may contain both image data as well as parameter values which control the Camera Raw image adjustment engine. The Adobe Digital Negative Group is one such raw image format (e.g., ".dng"). Such a raw file can be provided as a training input image to learn the nature of the adjustments contained in the training set. As can be appreciated, a neural network system, or portion thereof, may be trained to predict or reproduce a particular photographer's way of correcting images, or a particular artist's stylistic image adjustments. In such a case, images associated with the particular photographer or artist may be used as input training images.

In some cases, the input image may be preprocessed. For example, because eyes are sensitive to slight exposure variations, it may be valuable to have accurate image exposure prediction. As photographs may be greatly underexposed or overexposed, it can be advantageous to perform preprocessing in which the exposure is analytically predicted in order to bring the image into a reasonable range. One method can be measuring the average image luminance, <L>, (the average value of Luminance in Lab color space for example) and then fitting a simple function to predict exposure as a function of <L>. One exemplary linear function includes: exposure (<L>)=e0+g*(<L>−L0). Such a function can be fit to a set of images to obtain the constants e, g and L0. The input image can then be rendered with this predicted exposure adjustment applied. This corrected image is then used as the input image. In some cases, the initial parameter for which a value is predicted may be exposure in order to fine tune the initial prediction afforded by the simple analytic formula.

The parameter determiner 206 is generally configured to determine, select, or identify a parameter and/or candidate parameter values associated with the parameter. A particular parameter is selected to predict or evaluate using a neural network. As described, a parameter generally refers to a type of adjustment that can be used to adjust or modify an image. By way of example only, a parameter may be exposure, contrast, highlights, shadows, blacks, whites, color vibrance, color saturation, color temperature, tint, sharpening, clarity, dehazing, various curve modulations, or the like. A candidate parameter value refers to a value associated with the parameter for use in rendering an image. For example, a candidate parameter value indicates an extent for adjusting or an extent to which to adjust a parameter.

As described, parameter adjustments can be identified in an iterative or sequential approach. In this regard, rather than predicting all parameter image adjustments at one time, only one parameter value is predicted at a time. As such, the neural network for this prediction can be simpler, smaller, and faster. Using such an iterative workflow, the parameter determiner 206 may identify a parameter for adjusting in each iteration. A parameter may be identified in any number of ways. As one example, a sequential predetermined list of parameters may be used to identify a parameter to analyze. For instance, assume a sequential predetermined list includes exposure, contrast, highlights, shadows, blacks, and whites. In such a case, in the first iteration, exposure may be initially identified as a parameter for which an adjustment is determined. Upon determining a parameter value for which to modify an image, in a second iteration, contrast is then identified as a parameter for which an adjustment is determined, and so on.

As another example, a parameter may be randomly identified. For instance, a random number generator may be used to select which parameter to analyze. As yet another example, a parameter may be identified using a neural network to select which parameter to analyze, for instance, based on an analysis of an initial, or previously rendered, image.

The parameter determiner 206 can also select candidate parameter values associated with the selected parameter for use in rendering an image(s). A candidate parameter value refers to a parameter value for use in rendering an image, such as an input image or previously rendered image. As described, in embodiments, the neural network being trained is provided with data pertaining to multiple rendered images to analyze and predict. As such, multiple candidate parameter values can be identified in association with a parameter. In this regard, an image can be rendered with a variation of the parameter that is being predicted. For example, assume image contrast is currently being predicted. In such a case, an image can be rendered with different values of the contrast parameter.

The candidate parameter values can be selected in any number of ways. In some cases, the candidate parameter values may be equally spaced values within an interval. For example, for contrast values, candidate parameter values may be equally spaced contrast values in the interval spanning −100 to 100. In other cases, candidate parameter values may be spaced symmetrically. For instance, assume an image has an associated nominal value of contrast. In such a case, candidate parameter values may be spaced symmetrically about the nominal value of contrast. As yet another example, candidate parameter values may be randomly selected from within a range of values. Candidate parameter values may be selected based on a predetermined set of parameter values or based on analysis of the particular input image or previously rendered image. As another example, a neural network may be used to predict the range of parameters to use. In some cases, this could be used in an iterative process, each subsequent running of the algorithm could refine the selection of candidate parameter values. The range of parameter variations may, for example, decrease with each subsequent invocation.

The image renderer 208 is configured to render an image in accordance with the selected candidate parameter values. In this regard, an input image is rendered with multiple variations of a parameter such that the various renderings can be analyzed and used to predict a parameter image adjustment. By utilizing multiple image renderings, each with a variation of the parameter being analyzed, the neural network does not need to understand the full complexity of the image adjustment and rendering engine. Rather, a rendering engine itself can generate each of the image renderings, and the multiple renderings can inform the neural network more directly. That is, rather than a neural network analyzing an image, the neural network can analyze a range of possible adjustments and resulting images. Because of the complexity of image processing engines, it is difficult to learn the result of a change of parameters. It would take an extensive amount of training examples and a complex neural network to be able to learn effectively.

By way of example only, assume a contrast prediction is being analyzed and a number of contrast values to render are selected as c0=−100; c1=−50; c2=0; c3=50; and c4=100. In such a case, an image can be rendered in association with each contrast value, resulting in image renderings I0, I1, I2, I3, and I4. Accordingly, a range of images are rendered, some with lower contrast values and some with higher contrast values.

The image analyzer 210 analyzes the rendered images. In embodiments, the rendered images can be analyzed to identify features associated therewith. Algorithms or neural networks can be used, for example, to identify features associated with the rendered images. A feature may be a value that can be output by a neural network (e.g., output values from a convolutional net, such as a net pretrained from in association with other problems, or specifically trained. A feature, or image feature, can be any feature, component, or aspect that can be identified within, or obtained from, an image. For instance, a feature can be derived from distribution, or histogram, of luminance and chrominance values in the image and measures of the variation of those values within selected tonal windows, e.g., deep shadow regions or mid shadow regions, midtones, etc. By way of example only, a feature may include mean (average) values of the luminance, L, and two chrominance values, a and b across the image. The standard deviations of these are also useful features. These same quantities can also be calculated for luminance subsets (masked regions) of the image such as the shadows, darks, midtones, lights and highlights, each defined by partitioning the image by the luminance values. Other quantities such as distributions (histograms) of L, a and b are also useful.

In one implementation, features can be represented via an analysis vector. An analysis vector can be generated for each image rendering. An analysis vector can represent an analysis of the current image state into a vector, a set of numbers, which is intended to convey relevant information needed for the neural network to form a prediction of the associated parameter. In implementations, the features and/or analysis vector can be tailored to the particular parameter under prediction.

The various analysis vectors can be aggregated or concatenated to form a composite analysis vector. For example, assume five image renderings are generated in association with five candidate parameter values. In such a case, the five image renderings can be analyzed to generate five analysis vectors, v0, v1, v2, v3, and v4. Such analysis vectors can be concatenated together to form the combined analysis vector V={v0, v1, v2, v3, v4}, which can be provided as input to the neural network. Thus, the composite input vector includes analysis vectors from multiple possible image processing parameter values.

The parameter value predictor 212 is configured to predict parameter image adjustments from features associated with the rendered image variations. In this regard, the parameter value predictor 212 can predict parameter image adjustments using composite analysis vectors. The parameter value predictor 212 can input a composite analysis vector associated with multiple image renderings to a neural network (e.g., within neural network system 234) associated with the corresponding parameter. In response, the neural network can output or provide a parameter image adjustment for the parameter. For instance, when multiple image renderings are generated in association with candidate parameter values for a particular parameter, the composite analysis vector can be input into the neural network trained to predict values for the particular parameter.

The neural network is trained to identify or predict the desired value of a parameter (e.g., contrast) given the composite analysis vector V as input. For example, a neural network predicting contrast can be represented as c_predicted (V, W), where W are the neural network weights (and bias thresholds) which are learned from backpropagation training. The network may have convolutional structures which capture spatially invariant information and/or fully connected structures or other variants.

Upon identifying a parameter image adjustment via a neural network, the parameter image adjustment can be compared to a reference parameter value to facilitate training of the neural network. In this regard, the neural network can be modified or adjusted based on the comparison such that the quality of subsequently identified parameter image adjustments increases. As described, a reference parameter value refers to a value of a parameter that is used as a standard, or ground-truth, for evaluating the quality of a parameter image adjustment identified in association with a training input image by the neural network.

A reference parameter value may be input or selected by a professional photographer as an ideal value for the image. The parameter value predictor 212 can access the reference parameter value (e.g., within training data 232) associated with the input image from which the various image renderings were generated. The parameter image adjustment can then be compared to the reference parameter value to compute any errors. Errors can be determined, for example, using loss functions, such as reconstruction loss, or the like. Errors determined using loss functions are used to minimize loss in the neural network by backwards propagation of such errors through the network. In this regard, such errors can then be fed back through the neural network to teach the network to reduce such errors in future iterations.

Upon identifying a parameter image adjustment, the image can be rendered with the predicted parameter value. In this regard, a new image can be rendered that has been corrected for a parameter. The rendered image can then be used as an input image into the next iteration for predicting a next parameter for the image. That is, an input image may include predicted values from the previous parameters being trained. Alternatively, an input image provided for predicting a next parameter for the image may include a known desired parameter value for a previous parameter(s). For example, in training a second parameter, an input image may have a known desired first parameter (e.g., as selected by a photographer).

As can be appreciated, such an iterative process may encompass one pass through each parameter being trained. Alternatively, the iterative process may include multiple passes through multiple parameters in order to enable fine tuning of the predictions. To this end, once the predictions are close to a desired range, further predictions may make smaller fine scale adjustments to improve the results.

The trained neural networks, such as sequentially trained neural networks, associated with various parameters can be stored, for example, in data store 230. The trained neural networks can then be used by the adjusting engine 216 to automatically identify parameter image adjustments for images. In particular, an adjusting engine 216 can generally identify parameter image adjustments in a similar manner as described with the training engine 204.

As with the training engine 204, an adjusting engine 216 may include a parameter determiner, an image renderer, an image analyzer, and a parameter value predictor. Such components may be the same components as those illustrated in association with the training engine 204, or separate components. For simplicity, some of these aspects will be discussed at a high-level in regard to the adjusting engine 216, but more details are generally provided above with respect to the training engine 204.

Adjusting engine 216 is generally configured to utilize a series of neural networks to identify parameter image adjustments for various parameters for use in adjusting an image. In this regard, the adjusting engine 216 can access and utilize trained neural networks in neural network system 234 to identify parameter image adjustments. The adjusting engine 216 can obtain an image(s) as input for which to identify parameter image adjustments. An input image for which parameter image adjustments are desired can be any type of image. In some cases, the input image may be preprocessed. For example, because eyes are sensitive to slight exposure variations, it may be valuable to have accurate image exposure prediction.

Generally, the adjusting engine 216 sequentially identifies parameter image adjustments for various parameters for an image. Accordingly, the adjusting engine may identify a first parameter image adjustment for a first parameter, followed by a second parameter image adjustment for a second parameter.

To identify a parameter image adjustment in association with a parameter, initially a parameter determiner can determine, select, or identify a parameter and/or candidate parameter values associated with the parameter. A particular parameter is selected to predict or evaluate using a neural network in a sequential approach. Using such an iterative workflow, the parameter determiner may identify a parameter for adjusting in each iteration. A parameter may be identified in any number of ways. As one example, a sequential predetermined list of parameters may be used to identify a parameter to analyze. As another example, a parameter may be randomly identified. For instance, a random number generator may be used to select which parameter to analyze. As yet another example, a parameter may be identified using a neural network to select which parameter to analyze, for instance, based on an analysis of an initial, or previously rendered, image.

The parameter determiner can also select candidate parameter values associated with the selected parameter for use in rendering an image(s). As described, in embodiments, the neural network is provided with data pertaining to multiple rendered images to analyze and predict. As such, multiple candidate parameter values can be identified in association with a parameter. In this regard, an image can be rendered with a variation of the parameter that is being predicted. For example, assume image contrast is currently being predicted. In such a case, an image can be rendered with different values of the contrast parameter. The candidate parameter values can be selected in any number of ways, some of which are described above.

Upon identifying a parameter to predict and candidate parameter values associated therewith, an image renderer can render an image in accordance with the selected candidate parameter values. In this regard, an input image is rendered with multiple variations of a parameter such that the various renderings can be analyzed and used to predict a parameter image adjustment. A rendering engine, or image processing engine, can be used to render such image variations.

In accordance with the rendered image variations, an image analyzer can analyze the rendered images to identify features associated therewith. Algorithms or neural networks can be used, for example, to identify features associated with the rendered images. In one implementation, features can be represented via an analysis vector. An analysis vector can be generated for each image rendering. An analysis vector can represent an analysis of the current image state into a vector, a set of numbers, which is intended to convey relevant information needed for the neural network to form a prediction of the associated parameter. In implementations, the features and/or analysis vector can be tailored to the particular parameter under prediction. The various analysis vectors can then be aggregated or concatenated to form a composite analysis vector.

The parameter value predictor can predict parameter image adjustments from features associated with the rendered image variations. In this regard, a parameter value predictor can predict parameter image adjustments using composite analysis vectors. The parameter value predictor can input a composite analysis vector associated with multiple image renderings to a neural network (e.g., within neural network system 234) associated with the corresponding parameter being analyzed. In response, the neural network can output or provide a parameter image adjustment for the parameter. For instance, when multiple image renderings are generated in association with candidate parameter values for a particular parameter, the composite analysis vector can be input into the neural network trained to predict values for the particular parameter.

Upon identifying parameter image adjustments, such parameter image adjustments can be provided as recommendations or suggestions. Accordingly, the recommended parameter image adjustments can be identified and provided to the user via a user device. In this regard, the parameter image adjustment(s) can be displayed via a display screen of the user device. Parameter image adjustment recommendations can be presented in any manner. As can be appreciated, in some cases, a parameter image adjustment recommendation may be provided immediately upon identifying for a parameter. In other cases, a set of parameter image adjustment recommendations may be provided upon performing each iteration associated with various parameters. For example, upon determining a first parameter image adjustment associated with a first parameter, a second parameter image adjustment associated with a second parameter, and a third parameter image adjustment associated with a third parameter, such first, second, and third parameter image adjustments can be provided as recommend parameter adjustments for an image.

In addition or in the alternative to providing parameter image adjustment recommendations, the identified parameter image adjustments can be applied to render an automatically adjusted imaged. That is, a parameter image adjustment(s) can be applied (e.g., based on a user selection or automatically) to an input image to automatically adjust or correct the image. By way of example, upon completion of a final iteration for identifying parameter image adjustments corresponding with various parameters, a version of fully adjusted image can be rendered, stored, and/or provided (e.g., to a user device). The identified parameter image adjustments and/or images rendered therefrom can be stored, for example, in data store 230.

As described, upon identifying a first parameter image adjustment, the process can be recursively applied to identify parameter image adjustments associated with various other parameters. For instance, upon identifying a parameter image adjustment for a particular parameter, the image can be rendered with the predicted parameter value. In this regard, a new image can be rendered that has been corrected for a parameter. The rendered image can then be used as an input image into the next iteration for predicting a next parameter for the image. That is, an input image may include predicted values from the previous parameters being predicted. Accordingly, a predicted parameter value for a parameter can be based on previously predicted parameter values for other parameters.

As can be appreciated, such an iterative process may encompass one pass through each parameter. Alternatively, the iterative process may include multiple passes through multiple parameters in order to enable fine tuning of the predictions. To this end, once the predictions are close to a desired range, further predictions may make smaller fine scale adjustments to improve the results.

Figure 3:
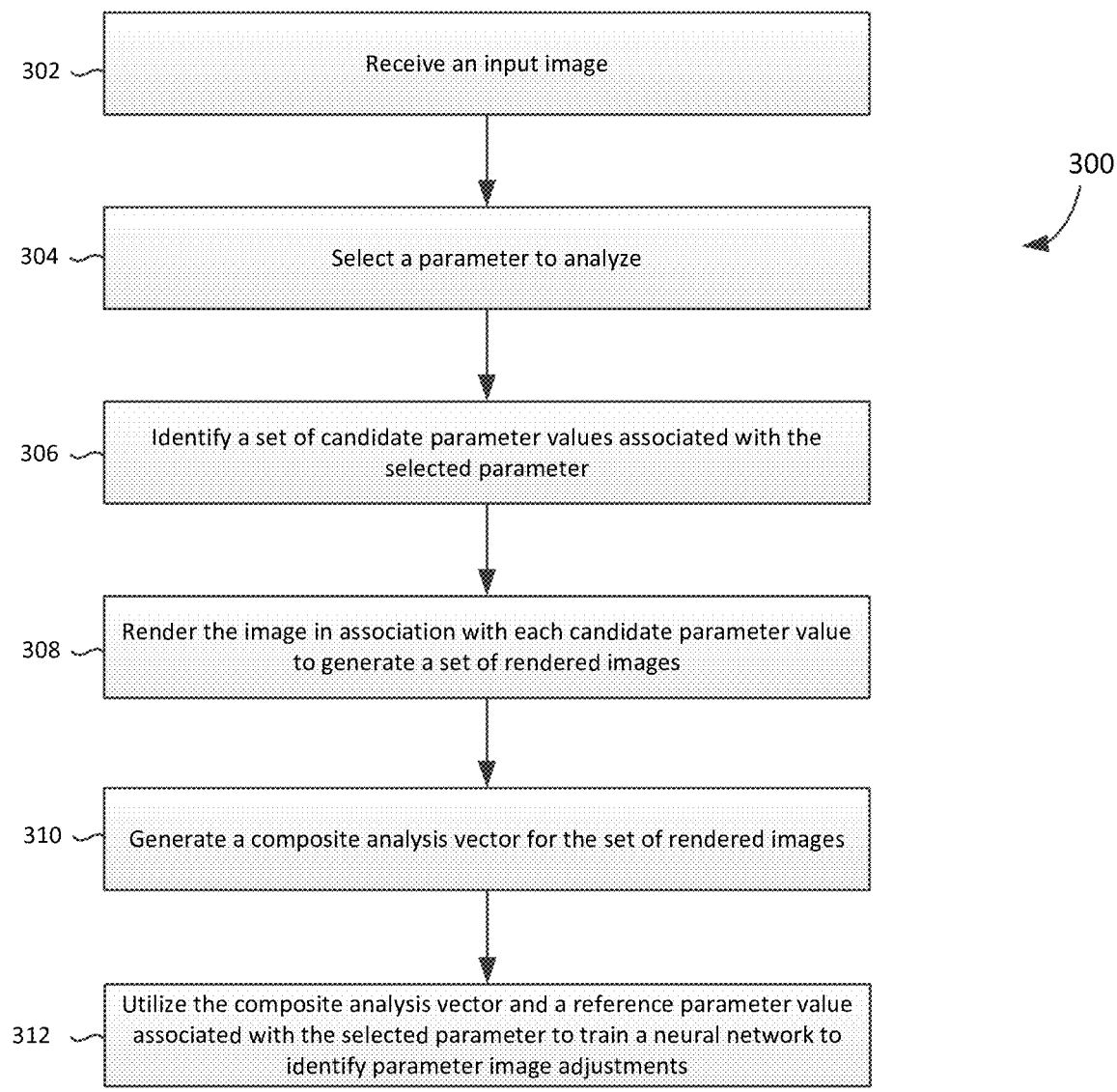
FIG. 3 illustrates an example method for training a neural network system to identify parameter image adjustments, in accordance with embodiments of the present invention.

With reference to FIG. 3, a process flow is provided showing an embodiment of method 300 for training a neural network system to identify a parameter image adjustments. Method 300 can be performed, for example, by training engine 204, as illustrated in FIG. 2.

At block 302, an image can be received or obtained for use in training a neural network system. An image can be selected from a group of images stored in a database, such as data store 230 of FIG. 2 and/or from an image database stored in the cloud. At block 304, a parameter to analyze can be selected. A parameter may be selected in any number of ways, such as, for example, using a predetermined sequence of parameters, a random selection of parameters, etc. For the selected parameter, a set of candidate parameter values associated with the selected parameter is identified, as indicated at block 306. Any number of candidate parameter values can be selected. At block 308, the image is rendered in association with each candidate parameter value to generate a set of rendered images. A composite analysis vector is generated for the set of rendered images, as indicated at block 310. In embodiments, an analysis vector representing features of the image can be generated for each rendered image. Such analysis vectors can then be combined to generate a composite analysis vector. At block 312, the composite analysis vector along with a reference parameter value associated with the selected parameter is used to train a neural network to identify parameter image adjustments for the parameter. In embodiments, the composite analysis vector can be input into the neural network, which can identify a parameter image adjustment. The parameter image adjustment can be compared to the reference parameter value to update or train the neural network to effectively identify parameter image adjustments. The method can be executed in an iterative manner to analyze various parameters and train neural networks in association therewith.

Figure 4:
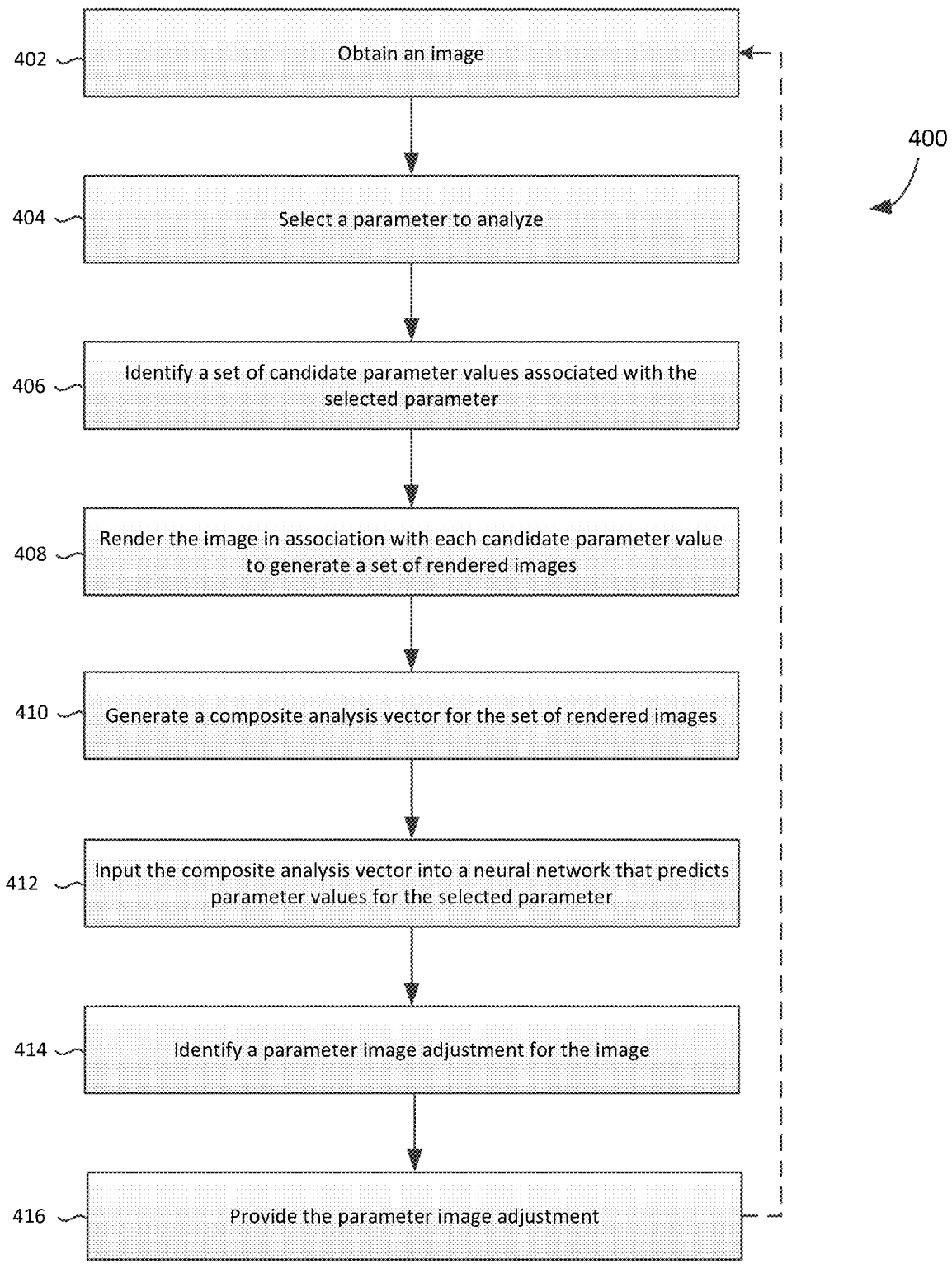
FIG. 4 illustrates an example method for identifying parameter image adjustments, in accordance with embodiments of the present invention.

FIG. 4 illustrates an example method 400 for identifying parameter image adjustments, in accordance with embodiments of the present invention. The neural network system used in method 400 can be comprised of multiple neural networks. At block 402, an image can be received or obtained for identifying parameter image adjustments. An image can be selected from a group of images stored in a database, such as data store 230 of FIG. 2 and/or from an image database stored in the cloud. At block 404, a parameter to analyze can be selected. A parameter may be selected in any number of ways, such as, for example, using a predetermined sequence of parameters, a random selection of parameters, etc. For the selected parameter, a set of candidate parameter values associated with the selected parameter is identified, as indicated at block 406. Any number of candidate parameter values can be selected. At block 408, the image is rendered in association with each candidate parameter value to generate a set of rendered images. A composite analysis vector is generated for the set of rendered images, as indicated at block 410. In embodiments, an analysis vector representing features of the image can be generated for each rendered image. Such analysis vectors can then be combined to generate a composite analysis vector. At block 412, the composite analysis vector is input into a neural network that predicts parameter values for the selected parameter. The neural network identifies a parameter image adjustment at block 414. Subsequently, the parameter image adjustment for the input image is provided, as indicated at block 416. The parameter image adjustment can be applied to image, and the adjusted image can be provided as an input image at block 402 to execute another iteration to identify a parameter image adjustment for another parameter. This process can continue until a set of parameter image adjustments are identified for various parameters. Such identified parameter image adjustments can provided as recommendation adjustments for the image and/or applied to the image to automatically correct the image.

Figure 5:
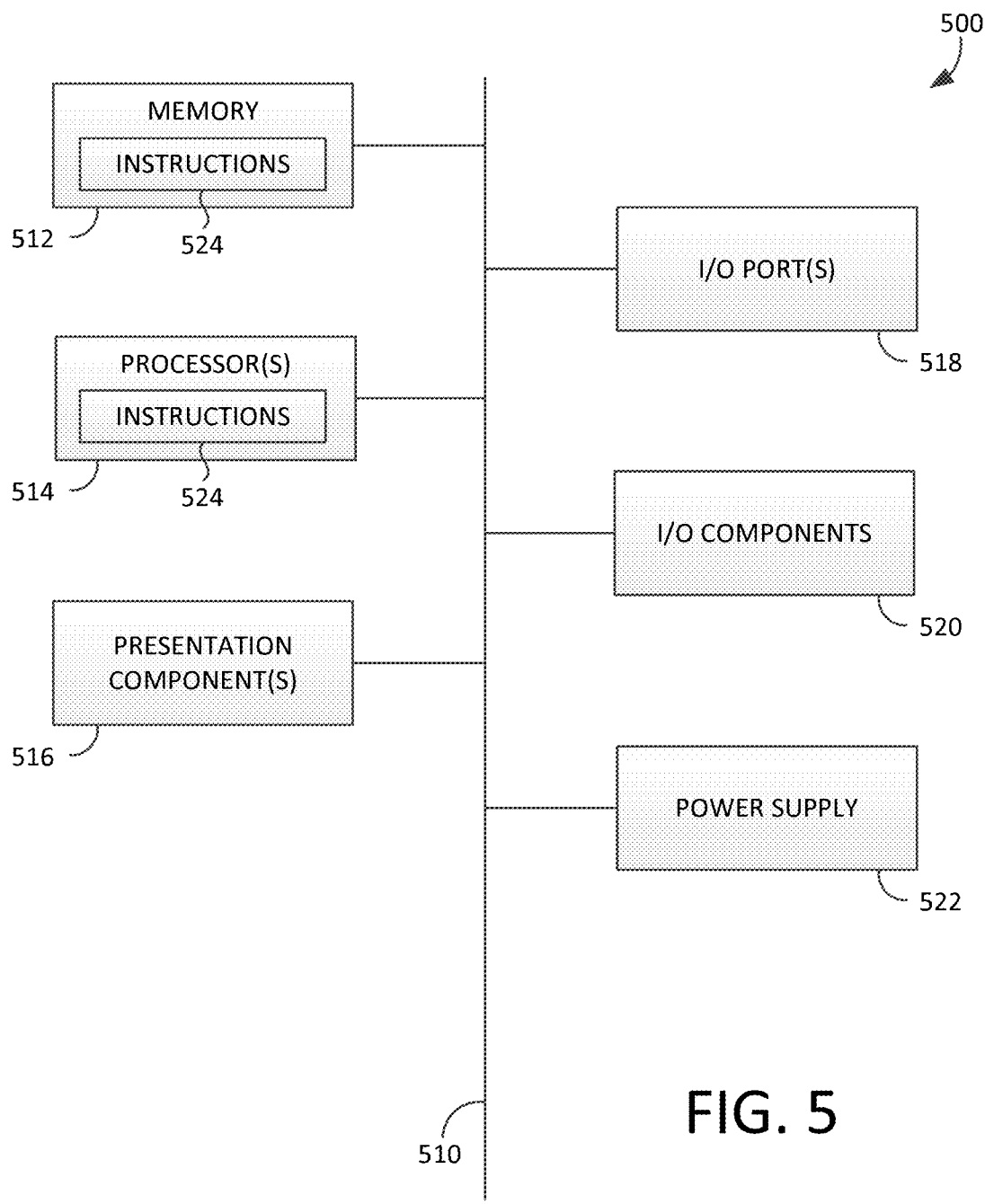
FIG. 5 is a block diagram of an example computing device in which embodiments of the present disclosure may be employed.

Having described embodiments of the present invention, FIG. 5 provides an example of a computing device in which embodiments of the present invention may be employed. Computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 5 is merely illustrative of an exemplary computing device that can be used in connection with one or more embodiments of the present invention. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. As depicted, memory 512 includes instructions 524. Instructions 524, when executed by processor(s) 514 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 500. Computing device 500 may be equipped with depth cameras, such as stereoscopic camera systems, infrared camera systems, RGB camera systems, and combinations of these, for gesture detection and recognition. Additionally, computing device 500 may be equipped with accelerometers or gyroscopes that enable detection of motion. The output of the accelerometers or gyroscopes may be provided to the display of computing device 500 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for training a neural network system to identify parameter image adjustments, the method comprising:
    identifying a set of candidate parameter values associated with a parameter to be analyzed in association with an image;
    rendering the image in accordance with each candidate parameter value to generate a set of rendered images;
    generating an analysis vector for each of the rendered images based on corresponding sets of features identified for each of the rendered images;
    concatenating the analysis vectors into a composite analysis vector;
    using a neural network to identify a parameter image adjustment to apply to the image based on the composite analysis vector; and
    training the neural network based on a comparison of the identified parameter image adjustment and a reference parameter value associated with the parameter being analyzed.

2. The computer-implemented method of claim 1, further comprising:
    selecting the parameter to be analyzed based on a predetermined sequence of parameters, a random selection of parameters, an algorithm, or parameter selection neural network.

3. The computer-implemented method of claim 1, wherein the set of candidate parameter values comprises a set of equally spaced values within an interval, a set of symmetrically spaced values about a nominal value, or randomly spaced values within an interval.

4. The computer-implemented method of claim 1, wherein the set of candidate parameter values is identified based on a predetermined set of parameter values for the parameter or based on analysis of the image.

5. The computer-implemented method of claim 1 further comprising:
selecting the neural network based on the parameter being analyzed.

6. The computer-implemented method of claim 1, further comprising:
identifying the sets of features for each of the rendered images.

7. The computer-implemented method of claim 1, wherein the reference parameter value comprises a value associated with the parameter indicated as a desired value.

8. The computer-implemented method of claim 1 further comprising:
generating a new image using the identified parameter image adjustment or the reference parameter value;
selecting a second parameter to be analyzed in association with the new image;
identifying a second set of candidate parameter values associated with the second parameter;
rendering the new image in accordance with each candidate parameter value in the second set of candidate parameter values to generate a second set of rendered images;
using a second neural network to identify a second parameter image adjustment to apply to the new image based on features associated with the second set of rendered images; and
training the second neural network based on a comparison of the second parameter image adjustment and a second reference parameter value associated with the second parameter being analyzed.

9. One or more computer-readable storage media having a plurality of executable instructions embodied thereon, which, when executed by one or more processors, cause the one or more processors to perform a method for identifying parameter image adjustments, the method comprising:
identifying a set of candidate parameter values associated with a parameter to be analyzed in association with an image;
rendering the image in accordance with each candidate parameter value to generate a set of rendered images;
generating an analysis vector for each of the rendered images based on corresponding sets of features identified for each of the rendered images;
concatenating the analysis vectors into a composite analysis vector; and
inputting the composite analysis vector into a neural network to identify a parameter image adjustment to apply to the image.

10. The media of claim 9, the method further comprising:
selecting the parameter to be analyzed based on a predetermined sequence of parameters, a random selection of parameters, an algorithm, or parameter selection neural network.

11. The media of claim 9, wherein the set of candidate parameter values comprises a set of equally spaced values within an interval, a set of symmetrically spaced values about a nominal value, or randomly spaced values within an interval.

12. The media of claim 9, further comprising:
selecting the neural network based on the parameter being analyzed.

13. The media of claim 9, further comprising:
identifying the sets of features for each of the rendered images.

14. The media of claim 9, the method further comprising:
generating a new image using the identified parameter image adjustment;
selecting a second parameter to be analyzed in association with the new image;
identifying a second set of candidate parameter values associated with the second parameter;
rendering the new image in accordance with each candidate parameter value in the second set of candidate parameter values to generate a second set of rendered images;
analyzing the second set of rendered images to generate a second composite analysis vector representing features associated with the second set of rendered images; and
inputting the second composite analysis vector into a second neural network to identify a second parameter image adjustment to apply to the new image.

15. The media of claim 9, wherein the identified parameter image adjustment is provided as a recommended adjustment for the parameter.

16. The media of claim 9, wherein the identified parameter image adjustment is applied to the image.

17. The media of claim 14, wherein the parameter image adjustment and the second parameter image adjustment are provided as recommended adjustments for the corresponding parameters.

18. The media of claim 14, wherein the parameter image adjustment and the second parameter image adjustment are applied to the image.

19. A computing system comprising:
means for training a neural network system, wherein the neural network system includes a set of neural networks sequentially trained using image variation to identify parameter image adjustments for images; and
means for identifying parameter image adjustments for an input image using the trained neural network system, the parameter image adjustments identified based on concatenated analysis vectors generated from a set of rendered images based on corresponding sets of features identified for each of the rendered images.

20. The system of claim 19, wherein each of the neural networks is trained based on a comparison of a parameter image adjustment identified by the corresponding neural network and a reference parameter value associated with the parameter for which the parameter image adjustment is identified.

* * * * *